United States Patent
Gilling et al.

(10) Patent No.: US 11,281,505 B2
(45) Date of Patent: Mar. 22, 2022

(54) MANAGEMENT OF APPLICATION PROGRAMMING INTERFACE (API) CONVERSION FOR END USERS

(71) Applicant: Moesif, Inc., San Francisco, CA (US)

(72) Inventors: Derric Stephen Gilling, San Francisco, CA (US); Xingheng Timothy Wang, San Francisco, CA (US)

(73) Assignee: Moesif, Inc., San Francisco, CA (US)

( * ) Notice: Subject to any disclaimer, the term of this patent is extended or adjusted under 35 U.S.C. 154(b) by 0 days.

(21) Appl. No.: 16/788,676

(22) Filed: Feb. 12, 2020

(65) Prior Publication Data

US 2021/0248019 A1 Aug. 12, 2021

(51) Int. Cl.
G06F 9/54 (2006.01)
G06F 13/16 (2006.01)

(52) U.S. Cl.
CPC .......... G06F 9/541 (2013.01); G06F 13/1668 (2013.01)

(58) Field of Classification Search
None
See application file for complete search history.

(56) References Cited

U.S. PATENT DOCUMENTS

| | | | |
|---|---|---|---|
| 9,813,509 B1* | 11/2017 | Visser | G06F 8/30 |
| 10,055,797 B2* | 8/2018 | Kunapuli | G06Q 40/12 |
| 2015/0350249 A1* | 12/2015 | Reno | H04L 63/1433 726/1 |
| 2015/0363374 A1* | 12/2015 | Lees | G06F 8/73 715/256 |
| 2015/0370693 A1* | 12/2015 | Voccio | G06F 11/3688 717/128 |
| 2016/0026710 A1* | 1/2016 | Laredo | G06F 9/541 707/748 |
| 2016/0057107 A1* | 2/2016 | Call | H04L 63/02 726/11 |
| 2016/0077895 A1* | 3/2016 | Laredo | H04L 67/10 719/328 |
| 2017/0302589 A1* | 10/2017 | Leafe | H04L 63/0892 |
| 2019/0114181 A1* | 4/2019 | Goyal | G06F 16/245 |
| 2020/0065084 A1* | 2/2020 | Assad | G06F 11/3466 |
| 2020/0117523 A1* | 4/2020 | Morrison | G06N 20/00 |

* cited by examiner

Primary Examiner — Charles E Anya

(57) ABSTRACT

Systems, methods, and software described herein manage and process application programming interface (API) statistics associated with an API provider. In one example, a monitoring service for an API service provider may obtain API request information from the API provider. The monitoring service may then compare the API request information to an API filter configuration obtained for the API provider, wherein the API filter configuration comprises criteria to filter API users of an API provider into a plurality of conversion categories. Based on the comparison, the monitoring service may determine a conversion category for each of the API users and generate a summary based on the conversion categories for the API users.

20 Claims, 7 Drawing Sheets

| API USER GROUPS 610 | CONVERSION STEP 620 | CONVERSION STEP 621 | CONVERSION STEP 622 | CONVERSION STEP 623 | CONVERSION STEP 624 |
|---|---|---|---|---|---|
| GROUP 630 | 100% | 100% | 95% | 90% | 90% |
| GROUP 631 | 100% | 100% | 100% | 100% | 100% |
| GROUP 632 | 100% | 95% | 85% | 85% | 85% |
| GROUP 633 | 100% | 95% | 55% | 50% | 45% |

TREND OF INTEREST 650

FIGURE 6

MANAGEMENT OF APPLICATION PROGRAMMING INTERFACE (API) CONVERSION FOR END USERS

BACKGROUND

Web service application programming interfaces (APIs) are defined interfaces that permit interactions to occur between the service associated with the APIs and users of the APIs. These APIs may permit users to obtain data from the service associated with the API, post data to the service associated with the API, or provide some other data operation with relation to the service associated with the API. For example, a web service API may permit an eCommerce seller to obtain shipping information, such as cost estimates, from a shipping service provider. Thus, rather than locally importing and updating the information from the shipping service provider, the eCommerce seller may obtain the required information from one or more databases maintained by the shipping service provider.

However, although APIs may provide efficient access to data between different services, difficulties can occur in determining how the various end users interact with and use the APIs. These difficulties are often compounded when an API is available to large quantities of users, each with different functional reasons for using the API.

OVERVIEW

Provided herein are systems, methods, and software to monitor and identify conversion trends in application programming interface (API) requests. In one example, a monitoring service may obtain an API filter configuration associated with an API provider. The monitoring service may further obtain API request information associated with API requests from API users to the API provider, wherein the API request information comprises timestamps for each of the API requests and one or more API functions associated with each of the API requests. Once obtained, the monitoring service may compare the API request information to the API filter configuration to determine a conversion category for each of the API users and generate a conversion summary based on the comparison.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 6 illustrates a data structure for demonstrating the conversion rate for API users according to an implementation.

DETAILED DESCRIPTION

Figure 1:
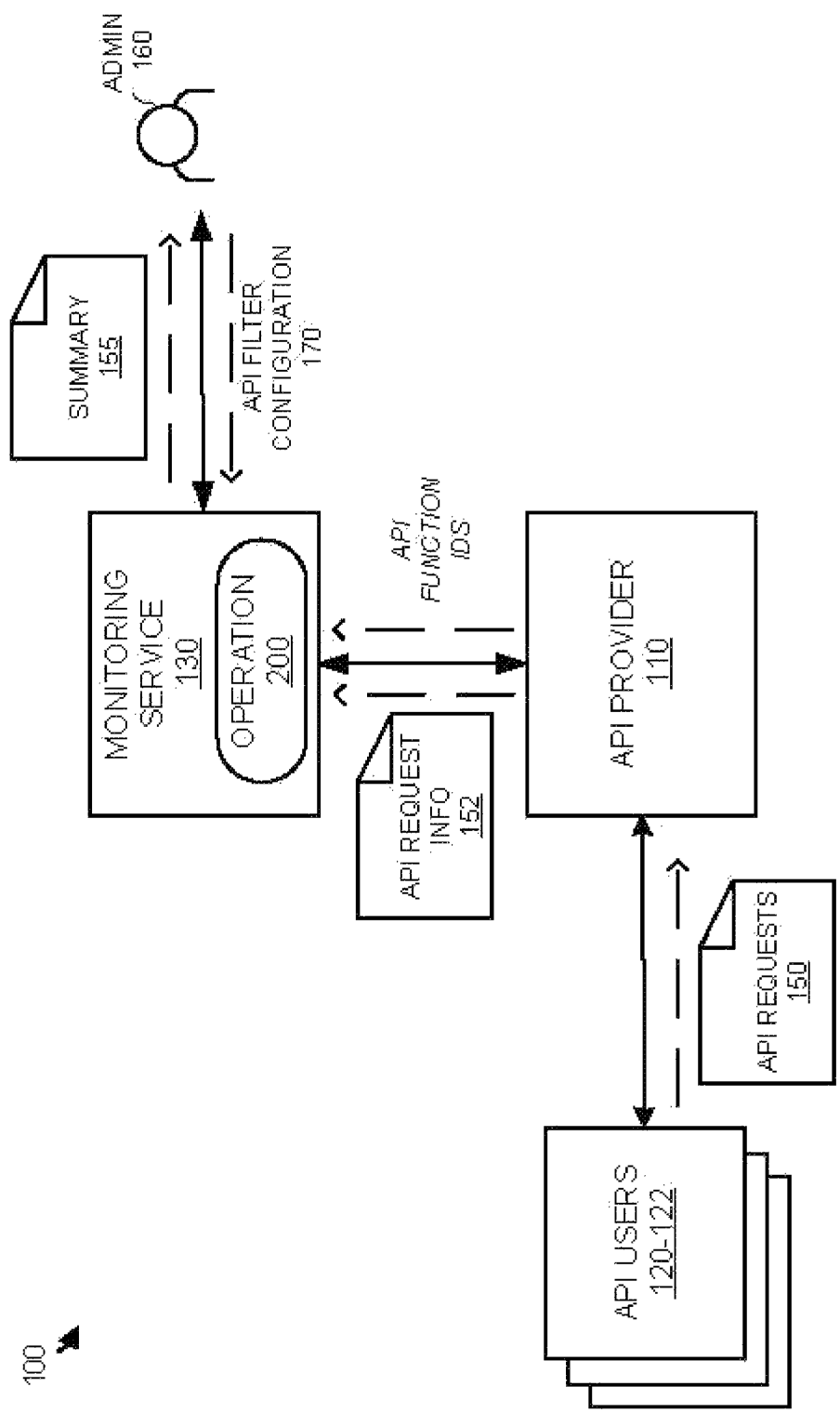
FIG. 1 illustrates a computing environment to manage application programming interface (API) statistics according to an implementation.

FIG. 1 illustrates a computing environment 100 to manage application programming interface (API) statistics according to an implementation. Computing environment 100 includes API users 120-122, API provider 110, monitoring service 130, and administrator 160. Computing environment 100 further includes API requests 150, API request information 152, and summary 155. Monitoring service 130 provides operation 200 that is further described below in FIG. 2.

In operation, API users 120-122 generate API requests 150 over a network connection to API provider 110, wherein the requests may be used to provide various functionality for the API users. API requests 150 may correspond to requests to retrieve information from a service provided by API provider 110, post information to a service provided by API provider 110, modify data stored by a service provided by API provider 110, or some other operation associated with API provider 110. As an example, an API request of API requests 150 may request a social media post corresponding to a user of a social media service provided by API provider 110. API users 120-122 may correspond to individual users, service providers, such as other web services (video, social media, and the like), or some other user of a web API. API provider 110 may comprise a social media API provider, a mail service API provider, a video service API provider, or some other API provider.

As API requests 150 are obtained by API provider 110, API request information 152 is provided to monitoring service 130. This API request information 152 may include header information for the API requests obtained from API users 120-122. In some implementations, monitoring service 130 may extract header portions of the packets from API users 120-122 and relevant API attributes for the request from the header. The API attributes may include a user identifier associated with the API request, the API function included in the request, a timestamp associated with the request, or some other information related to the API request. Once the API attributes are extracted or otherwise identified, the API attributes from the API requests may be used to generate various summaries of the API interactions with API provider 110.

In some implementations, as API request information 152 is obtained by monitoring service 130, monitoring service 130 may determine how each of the users are interacting with API provider 110. In particular, administrator 160 associated with API provider 110 may provide monitoring service 130 with API filter configuration 170, wherein API filter configuration 170 is used to classify API users 120-122 into different conversion categories for using API provider 110. In at least one implementation, API filter configuration 170 may define time period requirements and API function usage requirements for API users to be classified into the various conversion categories. For example, a first conversion category may exist for all API users that initially register to use API provider 110. Additionally, a second conversion category may apply to users that use one or more specific API functions within a defined time period. As a result, API users may graduate from a first category to a second category, and to further additional categories based on the API function usage (in some examples as a function of time). Once API filter configuration 170 is obtained by monitoring service 130, monitoring service 130 may compare the API request information to the attribute criteria defined in the API filter configuration to allocate the API users to the various categories.

After processing the API function request information associated with the API users, monitoring service 130 may generate a summary for at least one administrator associated with API provider 110. The summary may comprise a graph, a table, or some other data structure, a notification with statistical conversion values, or some other information related to the conversion of users to API provider 110, including combinations thereof. For example, monitoring service 130 may generate a graph that demonstrates the conversion of users as a function of time for using API provider 110. In some examples, the display may be provided to administrator 160 in response to a request by administrator 160. In other examples, monitoring service 130 may identify trends that satisfy criteria for a notification and may provide a notification to administrator 160 indicating the trend. The trend may correspond to users failing to be converted to a particular category, a sudden drop in the quantity of users being converted to a particular category, or some other trend.

Figure 2:
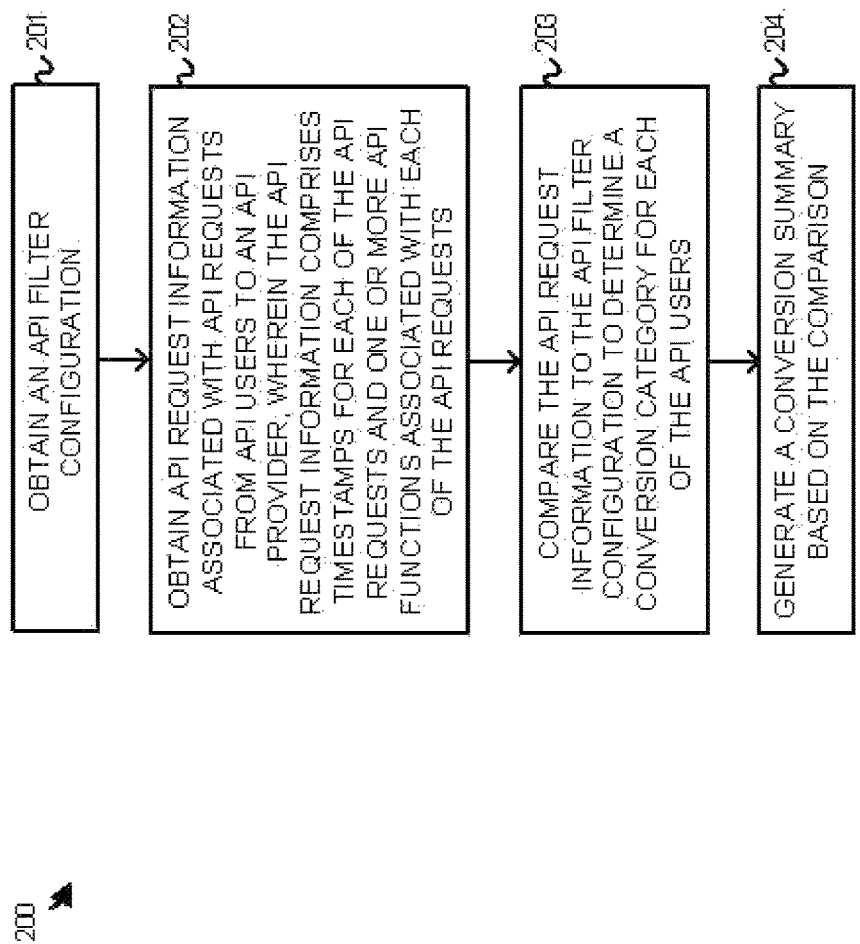
FIG. 2 illustrates an operation of a monitoring service to monitor conversion trends in API requests according to an implementation.

FIG. 2 illustrates an operation 200 of a monitoring service to monitor conversion trends in API requests according to an implementation. The processes of operation 200 is referenced parenthetically in the paragraphs that follow with reference to systems and elements of computing environment 100 of FIG. 1.

As depicted, operation 200 includes obtaining (201) an application programming interface (API) filter configuration, wherein the API filter configuration comprises criteria to filter API users of an API provider into a plurality of conversion categories. In some implementations, an administrator associated with an API provider may define criteria for the various conversion categories. The criteria may include a time period requirement for API requests to the API provider, API function type usage requirements, an ordering requirement for API functions, or some other requirement to classify API users into different conversion categories. For example, an administrator may define criteria for a particular conversion category as completing twenty API calls of a particular function within a seven-day period. In some examples, each of the categories may be tiered, wherein an API user may qualify for a first category and, subsequently, qualify for a second category.

Once the API filter configuration is obtained by monitoring service 130, operation 200 further obtains (202) API request information associated with API requests from the API users to the API provider, wherein the API request information comprises timestamps for each of the API requests and one or more API functions associated with each of the API requests. The API request information may be provided by API provider 110 at periodic intervals, during downtime periods of requests to API provider 110, in response to a request from monitoring service 130, or at some other interval. In some implementations, API request information 152 may include at least a portion of the headers corresponding to API requests 150. This header information for the packets associated with API requests 150 may include an identifier for the user generating the request, a timestamp associated with the request, an identifier for the API function requested, or some other information related to the API request. In some examples, API request information 152 may include the entire header, however, API request information 152 may include attributes or portions of the header that are relevant to monitoring service 130.

As the API request information is obtained by monitoring service 130, operation 200 may compare (203) the API request information to the API filter configuration to determine a conversion category of the plurality of conversion categories for each of the API users. In some implementations, monitoring service 130 may determine what criteria is satisfied for a particular API user, wherein the API user may be required to qualify for each conversion category tier prior to moving to another tier. These tiers may correspond to development tiers, testing tiers, deployment tiers, or some other tiers for the API users.

After providing the comparing the API request information to the filter configuration, operation 200 may generate (204) a conversion summary based on the conversion categories for the API users. In some examples, the summary may comprise a graph, table, or some other data structure indicating category information for the different API users. For example, a graph may indicate a ratio of API users that achieve each of the different conversion categories. Thus, the graph may indicate that 100% of the users achieve the first category, 85% achieve the second category, and 60% achieve the third category. Other types of summaries may further include a table that demonstrates API users in the various different categories, changes in the different categories over time, or some other similar summary.

In some implementations, the summary may be used to group API users based on similarity attributes associated with the API users. These similarity attributes may comprise geographic regions, industry types, or some other similarity attribute. For example, a summary may be generated that indicates the rate of conversion for API users based on geographic region (i.e., ratio of API users from each geographic region that qualify for each category).

In some implementations, the summary may be used to provide information about conversion rate as a function of time. In particular, the summary may comprise a graph that indicates the percentage of users that qualify for a conversion category based on their start date. For example, a summary may indicate for an API user start date (day, month, etc.) the quantity of users that qualify for the third tier of conversion. Advantageously, summary 155 may provide feedback to administrator 160 that could indicate possible issues with the API, possible changes in the uses of the API by the API users, or some other information associated with the use of the API In some examples, the summary may be generated based on a request from administrator 160, however, it should be understood that summary 155 may be generated by an automatically and provided to administrator 160. The summary may be generated at periodic intervals or may be generated when criteria of interest are satisfied. The criteria of interest may comprise threshold quantities of users qualifying for a conversion group, a threshold change in conversion for a particular conversion category or categories, or some other criteria for generating summary 155. For example, monitoring service 130 may determine that the ratio of users qualifying for a particular conversion category falls below a threshold value. In response to falling below a threshold value, monitoring service 130 may generate a summary that indicates information about the conversion category, wherein the information may include conversion rate to the category as a function of time.

Figure 3:
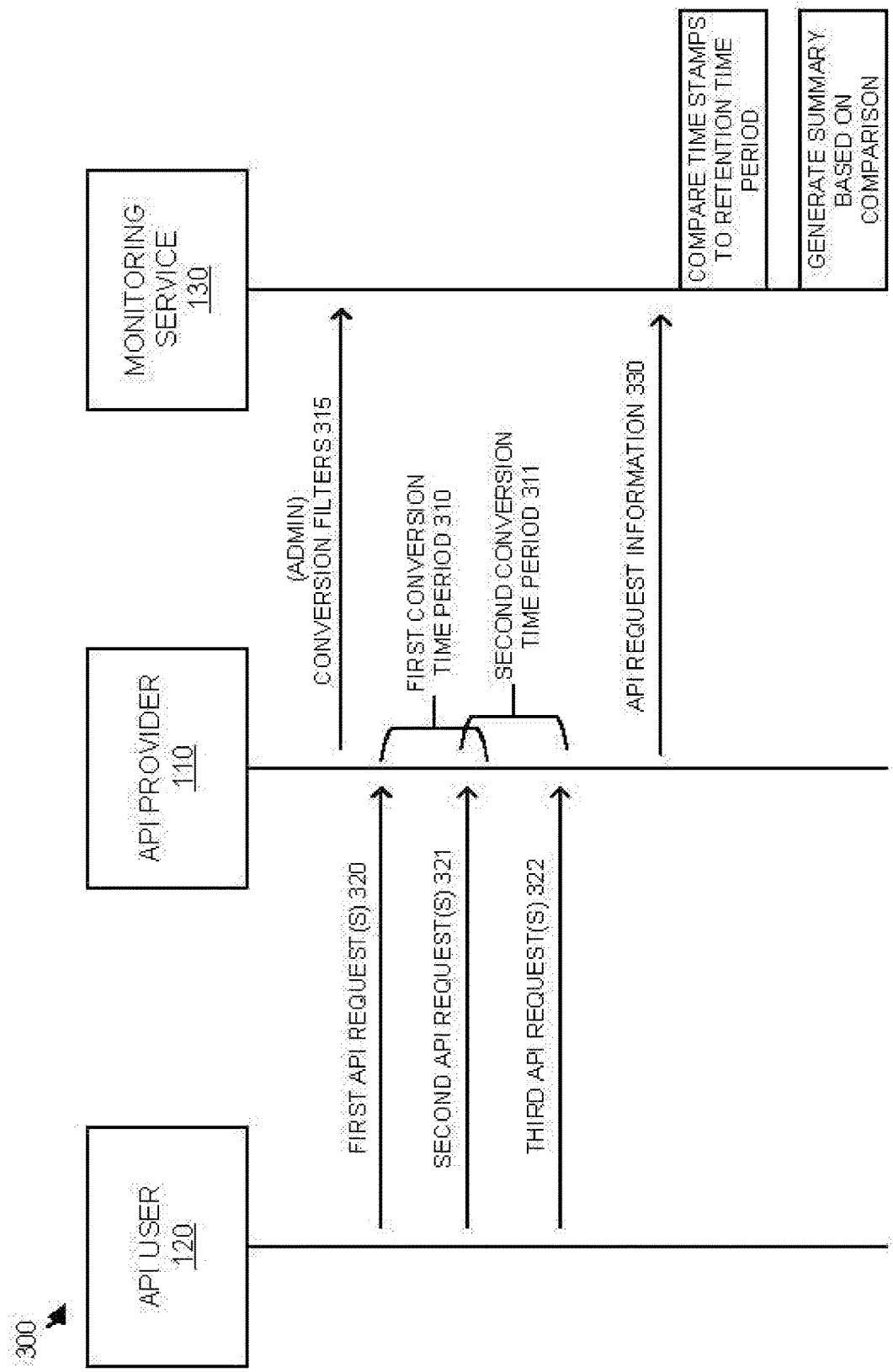
FIG. 3 illustrates a timing diagram of monitoring conversion trends in API requests according to an implementation.

FIG. 3 illustrates a timing diagram 300 of monitoring conversion trends in API requests according to an implementation. Timing diagram 300 includes API user 120, API provider 110, and monitoring service 130 from computing environment 100 of FIG. 1.

As depicted, API provider 110 may provide conversion filters 315 to monitoring service 130. In some implementations, conversion filters may be provided by an administrator of API provider 110, wherein the administrator may use a console computing system, such as a laptop computer, desktop computer, smartphone, or some other device.

Once the API conversion filters are applied, an API user 120 may provide first API request(s) 320 to API provider 110, placing API user 120 in an initial conversion category. In at least one example, by generating first API request(s) 320, first conversion time period 310 may be initiated that corresponds to conversion filters 315. In particular, the conversion filters may define criteria to classify API users into different conversion categories. The criteria may include a time period requirement for API requests to the API provider, API function type usage requirements, an ordering requirement for API functions, or some other requirement to classify API users into different conversion categories. Here, the criteria to qualify for a first conversion category requires that second API request(s) 321 are received by API provider 110 within first conversion time period 310. Second API request(s) 321 may comprise one or more API functions that are provided in any order or in a specific order. For example, following the triggering event by first API request(s) 320 that place the API user 120 in an initial category, the conversion criteria for the next conversion category may comprise providing second API request(s) 321 in any order within first conversion time period 310.

Once the second API request(s) are obtained within first conversion time period 310, a second conversion time period 311 is initiated that used to determine when API user qualifies for a second conversion category. Here, the criteria require that third API request(s) 322 are received by API provider 110 within second conversion time period 311. Again, the API functions in third API request(s) 322 may be required to be provided in a required order or may be provided in any order. As demonstrated third API request(s) 322 are provided within second conversion time period 311, indicating that API user qualifies for a second conversion category.

As the API requests are provided to API provider 110, API request information 330 is provided to monitoring service 130, wherein API request information 330 may include API function identifiers associated with each of the requests, timestamps associated with each the requests, API users associated with each of the requests, or some other information. API request information 330 may be provided periodically, based on a request from monitoring service 130, during API request downtimes, or at some other interval. Although demonstrated as providing the request information after API request(s) 320-322, the API request information may be provided at least partially during the API request(s). In response to receiving API request information 330, monitoring service 130 may compare API request information 330 to conversion filters 315 to determine a conversion category for at least API user 120. In this example, because API user satisfied the requirements for the first conversion category and, subsequently, satisfied the requirements for the second conversion category, monitoring service 130 may determine that API user 120 qualifies for the second conversion category. Monitoring service 130 may then generate a summary based on the comparison and the classification for API users 120 and other API users of API provider 110.

In at least one implementation, the summary may comprise one or more graphs, tables, or other data structures. The summary may be used to indicate the API users at each, conversion category, the conversion rate to each conversion category, the conversion rate as a function of time, or some other element regarding the API users and the conversion categories. In some examples, the summary may be generated based on a request from an administrator. In other examples, the request may be generated periodically or by identifying a trend of interest in the conversion data. The summary may be provided as an email, as part of a web application, a text message, or some other media to the administrator associated with the API provider.

Figure 4:
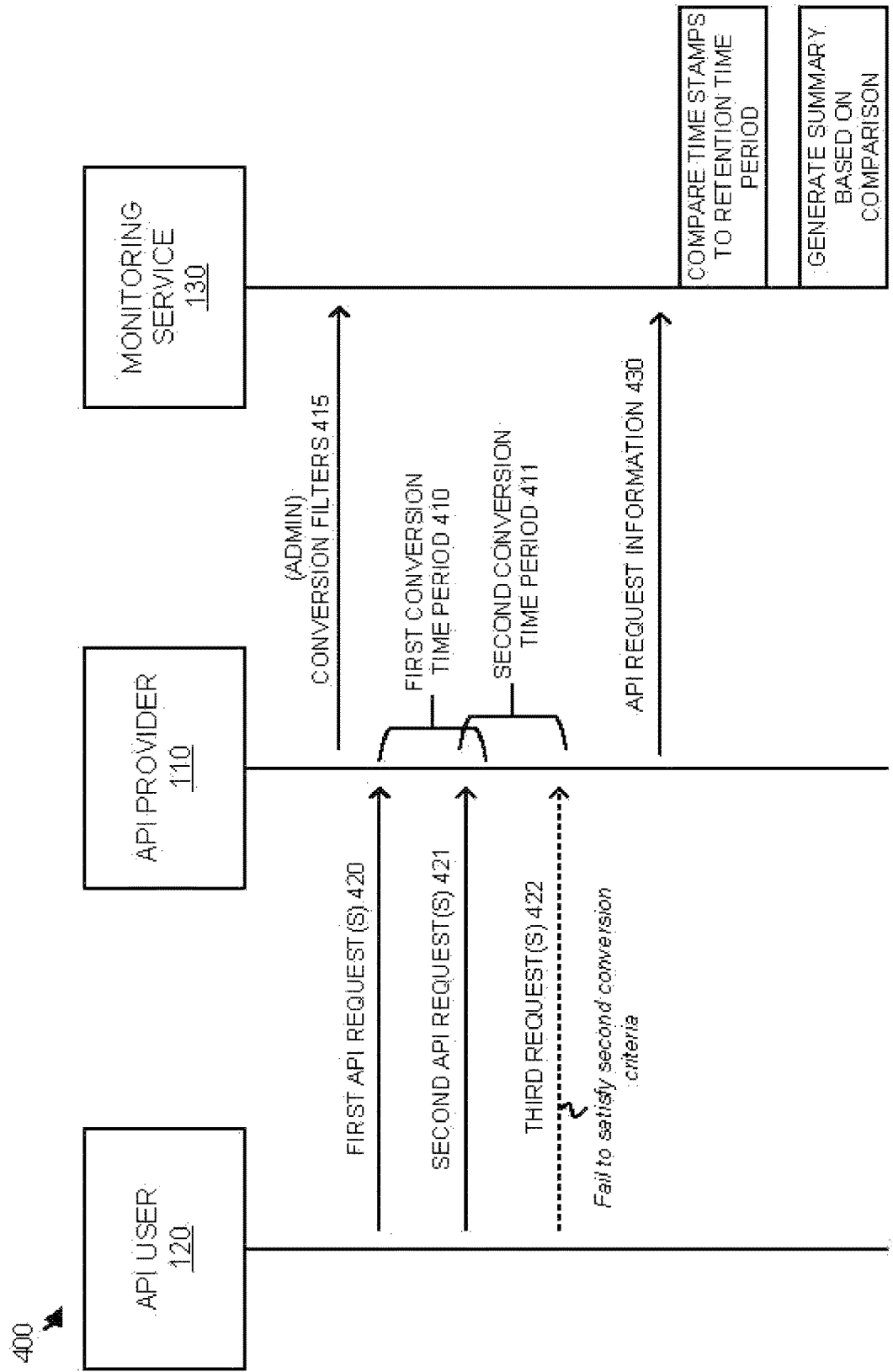
FIG. 4 illustrates a timing diagram of monitoring conversion trends in API requests according to an implementation.

FIG. 4 illustrates a timing diagram 400 of monitoring conversion trends in API requests according to an implementation. Timing diagram 400 includes API user 120, API provider 110, and monitoring service 130 from computing environment 100 of FIG. 1.

As depicted, API provider 110 may provide conversion filters 415 to monitoring service 130. In some implementations, conversion filters may be provided by an administrator of API provider 110, wherein the administrator may use a console computing system, such as a laptop computer, desktop computer, smartphone, or some other device.

Once the API conversion filters are applied, an API user 120 may provide first API request(s) 420 to API provider 110, placing API user 120 in an initial or base category. In at least one example, by generating first API request(s) 420, first conversion time period 410 may be initiated that corresponds to conversion filters 415. In particular, the conversion filters may define criteria to classify API users into different conversion categories. The criteria may include a time period requirement for API requests to the API provider, API function type usage requirements, an ordering requirement for API functions, or some other requirement to classify API users into different conversion categories. Here, the criteria to qualify for a first conversion category requires that second API request(s) 421 are received by API provider 110 within first conversion time period 410. Second API request(s) 421 may comprise one or more API functions that are provided in any order or in a specific order. For example, following the triggering event by first API request(s) 420, the conversion criteria for the next conversion category may comprise providing second API request(s) 421 in any order within first conversion time period 410.

Once the second API request(s) are obtained within first conversion time period 410, a second conversion time period 411 is initiated that used to determine when API user qualifies for a second conversion category. Here, the criteria require that third API request(s) 422 are received by API provider 110 within second conversion time period 411. Again, the API functions in third API request(s) 422 may be required to be provided in a required order or may be provided in any order. As demonstrated third API request(s) 422 are not provided within second conversion time period 411, indicating that API user fails to qualify for a second conversion category. This failure may also be caused by the failure to use the required functions, the failure to use the functions in a required order, or some other failure.

As the API requests are provided to API provider 110, API request information 430 is provided to monitoring service 130, wherein API request information 430 may include API function identifiers associated with each of the requests, timestamps associated with each the requests, API users associated with each of the requests, or some other information. API request information 430 may be provided periodically, based on a request from monitoring service 130, during API request downtimes, or at some other interval. Although demonstrated as providing the request information after API request(s) 420-422, the API request information may be provided at least partially during the API request(s). In response to receiving API request information 430, monitoring service 130 may compare API request information 430 to conversion filters 415 to determine a conversion category for at least API user 120. In this example, because API user 120 satisfied the requirements for the first conversion category but failed to satisfy the requirements for the second conversion category, monitoring service 130 may determine that API user 120 should be associated with the first conversion category. Monitoring service 130 may then generate a summary based on the comparison and the classification for API users 120 and other API users of API provider 110.

In at least one implementation, the summary may comprise one or more graphs, tables, or other data structures. The summary may be used to indicate the API users at each, conversion category, the conversion rate to each conversion category, the conversion rate as a function of time, or some other element regarding the API users and the conversion categories. In some examples, the summary may be generated based on a request from an administrator. In other examples, the request may be generated periodically or by identifying a trend of interest in the conversion data. The summary may be provided as an email, as part of a web application, a text message, or some other media to the administrator associated with the API provider.

Figure 5:
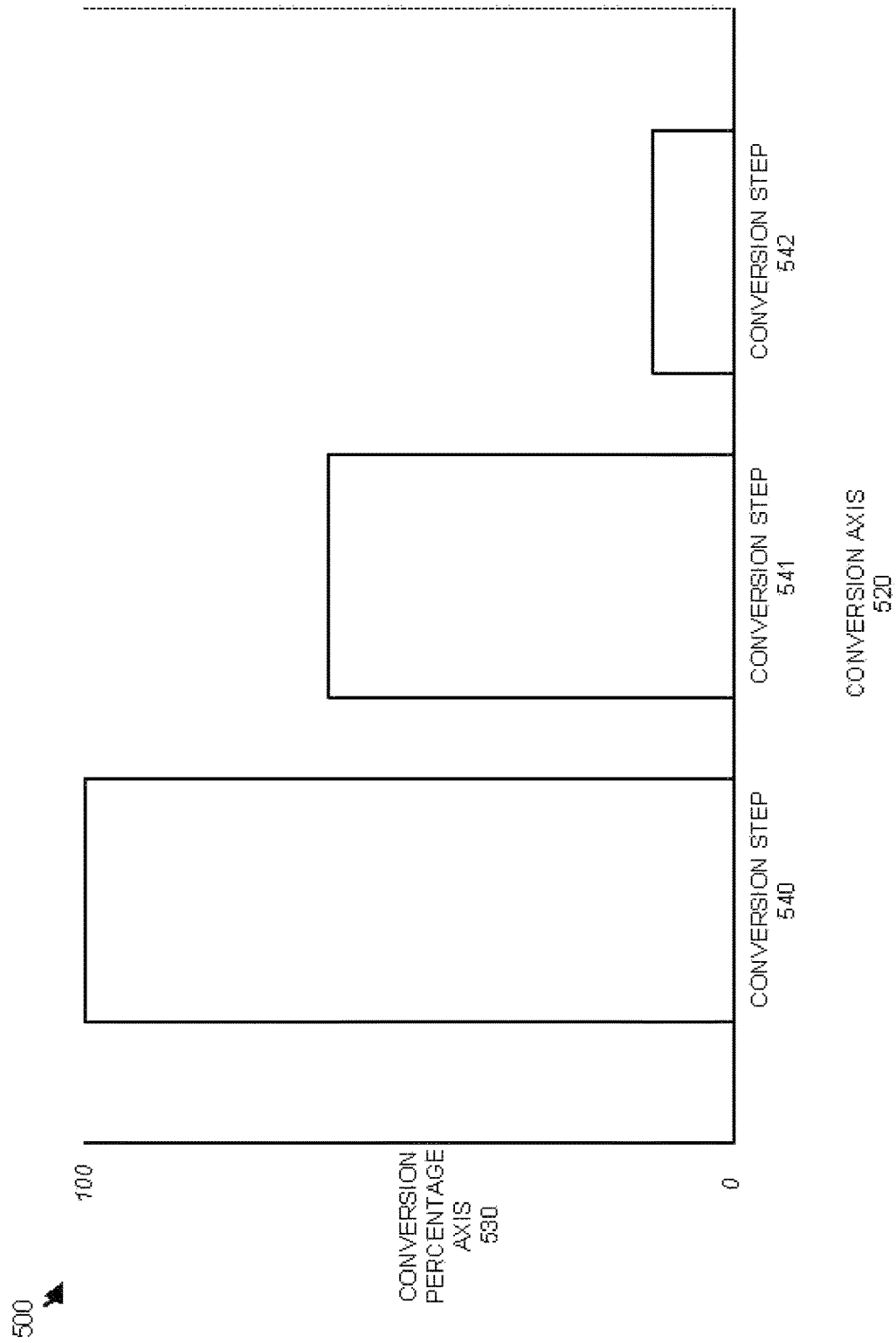
FIG. 5 illustrates a graph demonstrating the conversion rate for API users according to an implementation.

FIG. 5 illustrates a graph 500 demonstrating the conversion rate for API users according to an implementation. Graph 500 includes conversion axis 520 and conversion percentage axis 530. Conversion axis 520 further includes conversion steps 540-542, where conversion step 540 corresponds to an initial conversion classification for API users of an API service provider, and where conversion steps 541-542 correspond to subsequent conversion classifications. Here, when API users initially use the API service provider, the API users are allocated to conversion step 540, which shows a 100 percent rate. To transition to conversion step 541, each of the API users may be required to satisfy various criteria set for as part of a filter configuration defined for the API service provider. These criteria may include a quantity of overall API requests, the use of specific API functions, the use of specific API functions in a particular order, completing the API requests within a time period, or some other criterion, including combinations thereof. Here, each conversion step of conversion steps 541-542 includes a smaller percentage of users. This may result from users testing the API and never deploying the API, users developing the API and never deploying the API, or some other reason.

Although demonstrated in the example of graph 500 using ratios of users for each of the conversion steps or categories, it should be understood that other data structures and data sets may be provided to an administrator associated with an API provider. The data structures may indicate the conversion of one or more groups of users to different conversion groups, may indicate a ratio of API users that are converted to a particular step or category as a function of time, or may demonstrate other relevant features of the conversion data determined from the comparison of the API request information to the API filter configuration. As an example, a graph similar to graph 500 may indicate the conversion rate to the different conversion steps for API users associated with different geographic regions. In another example, a graph may demonstrate the ratio of users converted to conversion step 542 as a function of the date on when the users joined the API provider. Thus, for a particular join date (or dates) the conversion rate of the API users to conversion step 542 may be determined and demonstrated as part of a summary.

In some implementations, a summary may be generated that indicates the time period for user to reach each step in the conversion process. For example, following a first action or set of actions to place the user in a first conversion step, the monitoring service may determine the length of time that it takes the users to complete the second step or set of steps to qualify for a second conversion step. This information may be provided on a per user basis or may be provided for a subset of users. The information may be provided in text form, may be provided in graph form, or may be provided in any other manner. In at least some implementations, the information may be provided for users that share common traits, such as a common industry, a common geographic region, or some other common trait. For example, a graph may demonstrate, for users of a particular geographic region, the average time to complete each step in the conversion pipeline for the API provider.

FIG. 6 illustrates a data structure 600 for demonstrating the conversion rate for API users according to an implementation. Data structure 600 includes API user groups 510 with groups 620-633 and further includes conversion steps 620-624, which are representative of conversion categories for API users of an API service provider.

As depicted, data structure 600 groups API users of the API provider into groups 630, wherein the groups may be based on common geographic regions, common industries, common join date to the API service provider, or some other commonality with the API users. In addition to identifying the user groups, a monitoring service may monitor API request information and compare the request information to an API filter configuration, wherein the API filter configuration comprises criteria to filter the various API users into conversion steps (or categories) 620-624. Here, conversion steps 620-624 correspond to tiers, where each API user first qualifies for conversion step 620 and, subsequently qualifies for conversion steps 621-624, respectively.

As the API request information is compared against the API filter configuration, the monitoring service may be used to identify trends of interest, such as trend of interest 650. A trend of interest may occur when a value falls below a threshold value, when a value exceeds a threshold value, when a value varies by a threshold amount over other values, or some other trend of interest. For example, in data structure 600, group 633 demonstrates in conversion step 622 that a fewer quantity of API users are being converted from conversion step 621. As a result, when a summary is provided to an administrator associated with the API service provider, the summary may highlight or promote the trend of interest. Advantageously, the administrator may quickly and efficiently identify possible issues with the API, possible areas of improvement for the API, or some other information for the API.

In some implementations, the summary provided to the administrator may be provided in plain text, however, it should be understood that the summary may include graphs, tables, or some other data structure. For example, data structure 600 may be provided in the summary with trend of interest promoted using a different font, color, size, or some other promotional technique. In some examples, the summary is provided following a request from the administrator, however, the summary may be generated in response to identifying the trend of interest in some examples.

In some examples, the trend of interest may further correspond to the time period required to convert one or more users from a first conversion step to a second conversion step. For example, while a first group of users may be converted from a first step to a second step at a first average time, a second group of users may be converted from the first step to a second step at a much slower rate or time. Based on the difference in times between the user groups, the monitoring service may determine that a trend exists and may provide a summary of the trend to an administrator associated with the API.

Figure 7:
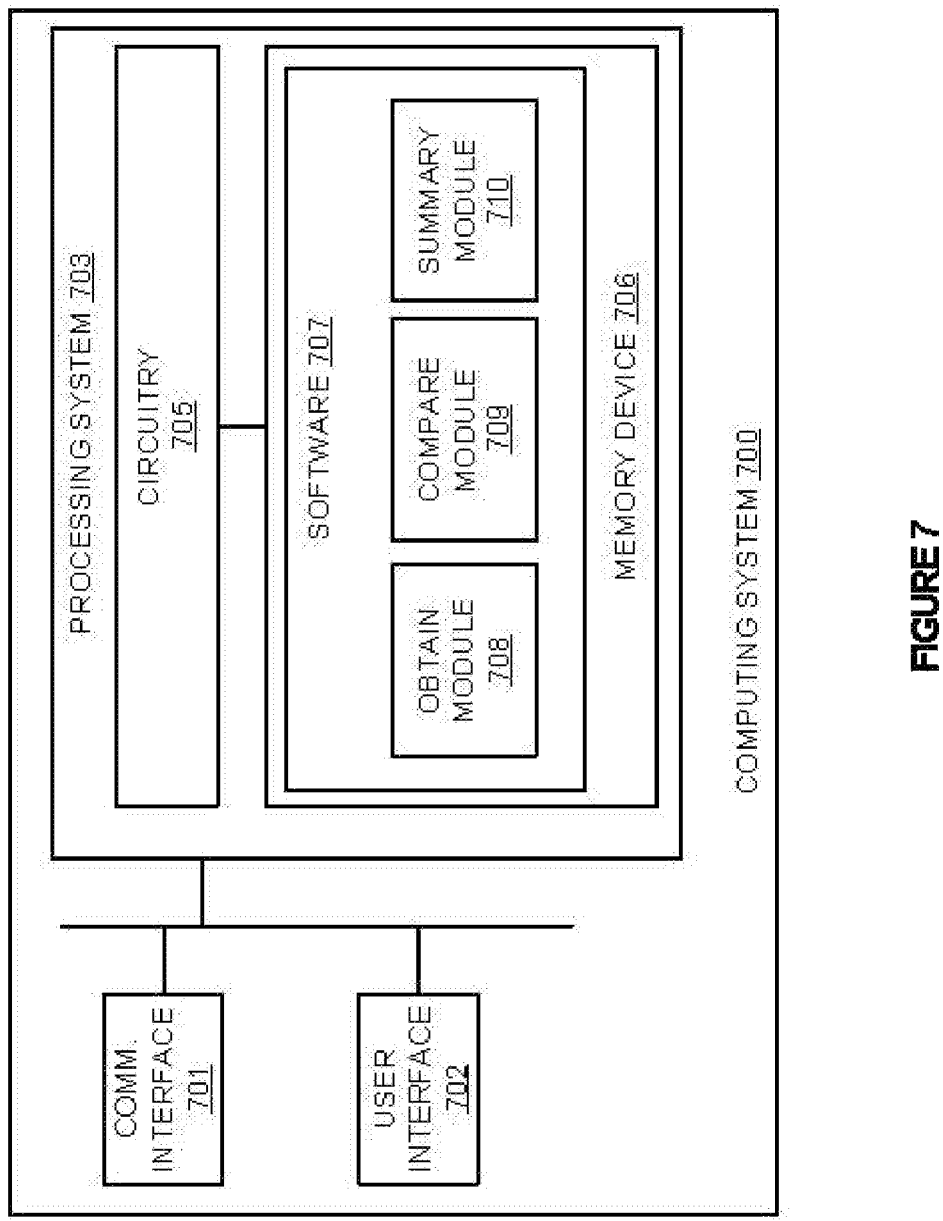
FIG. 7 illustrates a computing system to monitor API statistics and API user conversions according to an implementation.

FIG. 7 illustrates a computing system 700 to monitor API statistics and API user conversions according to an implementation. Computing system 700 is representative of any computing system or systems with which the various operational architectures, processes, scenarios, and sequences disclosed herein for a management system may be implemented. Computing system 700 is an example monitoring service 130, although other examples may exist. Computing system 700 comprises communication interface 701, user interface 702, and processing system 703. Processing system 703 is linked to communication interface 701 and user interface 702. Processing system 703 includes processing circuitry 705 and memory device 706 that stores operating software 707. Computing system 700 may include other well-known components such as a battery and enclosure that are not shown for clarity.

Communication interface 701 comprises components that communicate over communication links, such as network cards, ports, radio frequency (RF), processing circuitry and software, or some other communication devices. Communication interface 701 may be configured to communicate over metallic, wireless, or optical links. Communication interface 701 may be configured to use Time Division Multiplex (TDM), Internet Protocol (IP), Ethernet, optical networking, wireless protocols, communication signaling, or some other communication format—including combinations thereof. In at least one implementation, communication interface 701 may be used to communicate with one or more computing systems that act as an API provider that receives API requests from API users. Communication interface 701 may further communicate with one or more console devices that correspond to administrators associated with the API provider. The console devices may comprise smartphones, tablets, computers, or some other console device.

User interface 702 comprises components that interact with a user to receive user inputs and to present media and/or information. User interface 702 may include a speaker, microphone, buttons, lights, display screen, touch screen, touch pad, scroll wheel, communication port, or some other user input/output apparatus—including combinations thereof. User interface 702 may be omitted in some examples. In some examples, user interface 702 may be used to provide summaries to administrators associated with the API provider.

Processing circuitry 705 comprises microprocessor and other circuitry that retrieves and executes operating software 707 from memory device 706. Memory device 706 may include volatile and nonvolatile, removable and non-removable media implemented in any method or technology for storage of information, such as computer readable instructions, data structures, program modules, or other data. Memory device 706 may be implemented as a single storage device but may also be implemented across multiple storage devices or sub-systems. Memory device 706 may comprise additional elements, such as a controller to read operating software 707. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no case is the storage media a propagated signal.

Processing circuitry 705 is typically mounted on a circuit board that may also hold memory device 706 and portions of communication interface 701 and user interface 702. Operating software 707 comprises computer programs, firmware, or some other form of machine-readable program instructions. Operating software 707 includes obtain module 708, compare module 709, and trend module 710, although any number of software modules may provide a similar operation. Operating software 707 may further include an operating system, utilities, drivers, network interfaces, applications, or some other type of software. When executed by processing circuitry 705, operating software 707 directs processing system 703 to operate computing system 700 as described herein.

In one implementation, obtain module 708 directs processing system 703 to obtain API request information associated with API requests from API users to an API provider, wherein the API request information comprises timestamps for each of the API requests and one or more API functions associated with each of the API requests. Once the API request information is obtained, compare module 709 directs processing system to compare the API request information to an API filter configuration to determine a conversion category for each of the API users. In some implementations, obtain module 708 may obtain an API filter configuration from an administrator that comprises criteria to filter API users of the API provider into a plurality of different conversion categories. In some examples, the conversion categories may be tiered, such that an API user may satisfy criteria for a first category and only then migrate to a second category. The different categories may correspond to a development category, a testing category, a deployment category, or some other use category by the API user to interact with the API provider. For example, a textile company may use a mail service to ship its products to end consumers and the API provider may use an API to provide shipping cost information, estimated delivery dates, or some other information.

Once the conversion categories are determined, summary module 710 may direct processing system 703 to generate a conversion summary based on the conversion categories for the API users. The summary may comprise text and/or data structures to provide the summary to the end user. The summary may include information about the conversion of API users as a function of time, a quantity or ratio of users being converted to each of the different categories, or some other information. In some examples, the summary may group the API users based on common industry, geographic location, start data for use of the API provider, or some other grouping.

In at least one example, summary module 710 may identify trends in the conversion categories for the API users and provide information about the trends in the summary. The trends may be promoted using different text, highlighting, or other visual or audio aid to draw attention to the trend. The summary may be provided as a browser view, text, email, or some other platform to the administrator.

Returning to the elements of FIG. 1, API users 120-122, API provider 110, and monitoring service 130 may each comprise communication interfaces, network interfaces, processing systems, computer systems, microprocessors, storage systems, storage media, or some other processing devices or software systems and can be distributed among multiple devices. Examples of API users 120-122, API provider 110, and monitoring service 130 can include software such as an operating system, logs, databases, utilities, drivers, networking software, and other software stored on a computer-readable medium. API users 120-122, API provider 110, and monitoring service 130 may comprise, in some examples, one or more server computing systems, desktop computing systems, laptop computing systems, or any other computing system, including combinations thereof. Although demonstrated as separate from API provider 110, it should be understood that monitoring service 130 may execute on the same computing system or systems as API provider 110.

Communication between API users 120-122, API provider 110, and monitoring service 130 may use metal, glass, optical, air, space, or some other material as the transport media. Communication between API users 120-122, API provider 110, and monitoring service 130 may use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication between API users 120-122, API provider 110, and monitoring service 130 may be a direct link or can include intermediate networks, systems, or devices, and can include a logical network link transported over multiple physical links.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
  obtaining an application programming interface (API) filter configuration, wherein the API filter configuration comprises criteria to filter API users of an API provider into a plurality of conversion categories, wherein the plurality of conversion categories is tiered such that an API user qualifies for a previous conversion category prior to qualifying for a subsequent conversion category;
  obtaining API request information associated with API requests from the API users to the API provider, wherein the API request information comprises timestamps for each of the API requests and one or more API functions associated with each of the API requests;
  comparing the API request information to the API filter configuration to determine a conversion category of the plurality of conversion categories for each of the API users; and
  generating, for display, a conversion summary based on the conversion categories for the API users.

2. The method of claim 1, wherein the criteria comprise an API function usage requirement over a time period to qualify for each conversion category in the plurality of conversion categories.

3. The method of claim 1, wherein the conversion summary comprises a data structure, and wherein the method further comprises providing a display of the conversion summary to an administration computing system.

4. The method of claim 3, wherein the conversion summary comprises at least a graph indicating a ratio of the API users that achieved each conversion category of the plurality of conversion categories.

5. The method of claim 1 further comprising:
  classifying the API users into groups based on one or more similarity attributes; and
  wherein generating the conversion summary is further based on the groups.

6. The method of the claim 5, wherein the one or more similarity attributes comprise geographic regions, industries, or initial join time.

7. The method of claim 1 further comprising:
  determining a trend of interest based on comparing the API request information to the API filter configuration; and
  wherein generating the conversion summary occurs in response to determining the trend of interest.

8. The method of claim 1 further comprising:
  obtaining a request to generate the conversion summary; and
  generating the conversion summary in response to the request.

9. The method of claim 1, wherein the criteria comprise ordering requirements for API functions to qualify for each of the conversion categories.

10. A computing system comprising:
  one or more non-transitory computer readable media;
  a processing system operatively coupled to the one or more non-transitory computer readable media; and
  program instructions stored on the one or more non-transitory computer readable media that, when executed by the processing system, direct the processing system to:
    obtain an application programming interface (API) filter configuration, wherein the API filter configuration comprises criteria to filter API users of an API provider into a plurality of conversion categories, wherein the plurality of conversion categories is tiered such that an API user qualifies for a previous conversion category prior to qualifying for a subsequent conversion category;
    obtain API request information associated with API requests from the API users to the API provider, wherein the API request information comprises timestamps for each of the API requests and one or more API functions associated with each of the API requests;
    compare the API request information to the API filter configuration to determine a conversion category of the plurality of conversion categories for each of the API users; and
    generate, for display, a conversion summary based on the conversion categories for the API users.

11. The computing system of claim 10, wherein the criteria comprise an API function usage requirement over a time period to qualify for each conversion category in the plurality of conversion categories.

12. The computing system of claim 10, wherein the conversion summary comprises a data structure, and wherein the method further comprises providing a display of the conversion summary to an administration computing system.

13. The computing system of claim 12, wherein the conversion summary comprises at least a graph indicating a ratio of the API users that achieved each conversion category of the plurality of conversion categories.

14. The computing system of claim 10, wherein the program instructions further direct the processing system to:
classify the API users into groups based on one or more similarity attributes; and
wherein generating the conversion summary is further based on the groups.

15. The computing system of claim 14, wherein the one or more similarity attributes comprise geographic regions, industries, or initial join time.

16. The computing system of claim 10, wherein the program instructions further direct the processing system to:
determine a trend of interest based on comparing the API request information to the API filter configuration; and
wherein generating the conversion summary occurs in response to determining the trend of interest.

17. The computing system of claim 10, wherein the program instructions further direct the processing system to:
obtain a request to generate the conversion summary; and
generate the conversion summary in response to the request.

18. The computing system of claim 10, wherein the criteria comprise ordering requirements for API functions to qualify for each of the conversion categories.

19. A method comprising:
obtaining an application programming interface (API) filter configuration, wherein the API filter configuration comprises criteria to filter API users of an API provider into a plurality of conversion categories, wherein the plurality of conversion categories is tiered such that an API user qualifies for a previous conversion category prior to qualifying for a subsequent conversion category;
obtaining API request information associated with API requests from the API users to the API provider, wherein the API request information comprises timestamps for each of the API requests and one or more API functions associated with each of the API requests;
comparing the API request information to the API filter configuration to determine a conversion category of the plurality of conversion categories for each of the API users;
classifying the API users into groups based on one or more similarity attributes;
determining a trend of interest based on comparing the API request information to the API filter configuration; and
generating, for display, a conversion summary based on the conversion categories for the API users and the groups, wherein the conversion summary promotes the trend of interest.

20. The method of claim 19, wherein the one or more similarity attributes comprise geographic regions, industries, or initial join time.

* * * * *